(12) United States Patent
Kim et al.

(10) Patent No.: US 9,805,874 B2
(45) Date of Patent: Oct. 31, 2017

(54) MEMS VARIABLE CAPACITOR AND METHOD FOR DRIVING THE SAME

(75) Inventors: Chang Wook Kim, Seoul (KR); Dong Chan Park, Seoul (KR); Ju Young Song, Seoul (KR); Sang Hun Lee, Seoul (KR); Sung Bae Cho, Seoul (KR); Hyun Ho Yang, Daejeon (KR); Jun Bo Yoon, Daejeon (KR); Dong Hoon Choi, Daejeon (KR); Chang Hoon Han, Daejeon (KR)

(73) Assignees: LG INNOTEK CO., LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 299 days.

(21) Appl. No.: 13/698,893

(22) PCT Filed: May 27, 2011

(86) PCT No.: PCT/KR2011/003921
§ 371 (c)(1),
(2), (4) Date: Nov. 19, 2012

(87) PCT Pub. No.: WO2011/149311
PCT Pub. Date: Dec. 1, 2011

(65) Prior Publication Data
US 2013/0063857 A1    Mar. 14, 2013

(30) Foreign Application Priority Data

May 28, 2010 (KR) .................. 10-2010-0050592

(51) Int. Cl.
*H01G 5/013* (2006.01)
*H01G 7/00* (2006.01)
(Continued)

(52) U.S. Cl.
CPC ..................................... *H01G 5/16* (2013.01)

(58) Field of Classification Search
CPC ... H01G 5/16; H01G 5/18; H01G 7/06; G01L 9/0072
(Continued)

(56) References Cited

U.S. PATENT DOCUMENTS 7,965,016 B2    6/2011    Despesse et al.
8,039,922 B2    10/2011   Ni
(Continued)

FOREIGN PATENT DOCUMENTS

JP    2009-524387 A    6/2009
JP    2010-045217 A    2/2010
JP    2010045217 A *   2/2010

*Primary Examiner* — Eric Thomas
*Assistant Examiner* — Arun Ramaswamy
(74) *Attorney, Agent, or Firm* — Saliwanchik, Lloyd & Eisenschenk

(57) ABSTRACT

Disclosed herein is an MEMS variable capacitor and its driving method, the MEMS variable capacitor including, a first electrode, a second electrode floating over the first electrode upper part, a fixed electrode separated at the second electrode side surface, and a drifting electrode placed between the second electrode and the fixed electrode, connected to the second electrode, and physically contacting the fixed electrode by a voltage applied to the fixed electrode.

8 Claims, 4 Drawing Sheets

(51) Int. Cl.
  *H01H 7/06* (2006.01)
  *H04R 25/00* (2006.01)
  *G01R 27/26* (2006.01)
  *H01G 5/16* (2006.01)

(58) Field of Classification Search
  USPC .......... 361/277, 280, 281; 381/174; 324/661
  See application file for complete search history.

(56) References Cited

U.S. PATENT DOCUMENTS

| | | | |
|---|---|---|---|
| 2008/0078662 A1* | 4/2008 | Naito | H01H 59/0009 |
| | | | 200/181 |
| 2008/0238244 A1 | 10/2008 | Chaillout et al. | |
| 2008/0265710 A1* | 10/2008 | Ikehashi et al. | 310/309 |
| 2009/0237858 A1* | 9/2009 | Steeneken et al. | 361/278 |
| 2009/0302415 A1* | 12/2009 | Mueller et al. | 257/508 |
| 2009/0321232 A1* | 12/2009 | Naito | B81B 3/0078 |
| | | | 200/181 |

* cited by examiner

[Fig. 1]
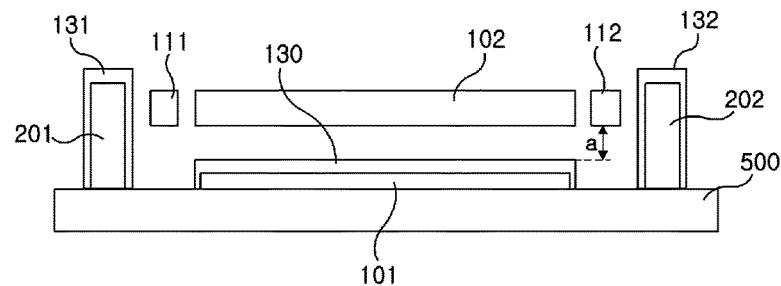
[Fig. 2]
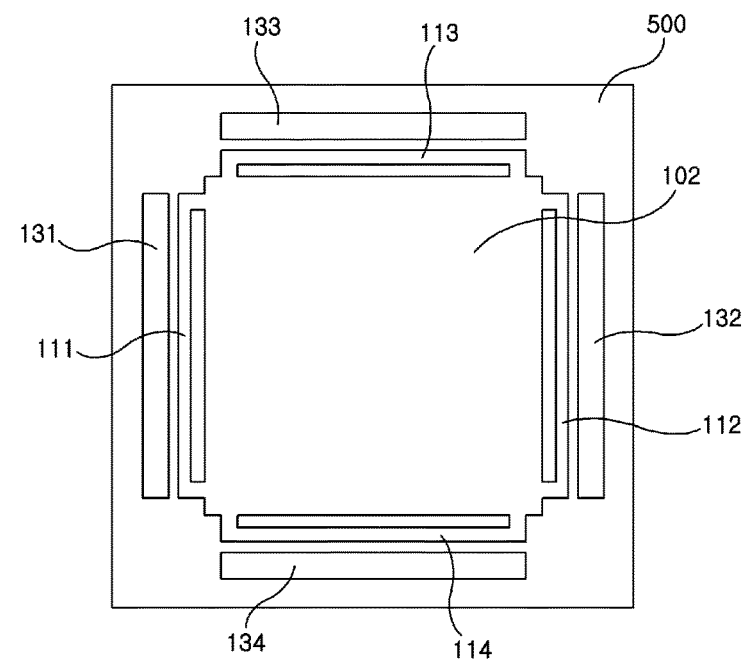
[Fig. 3]
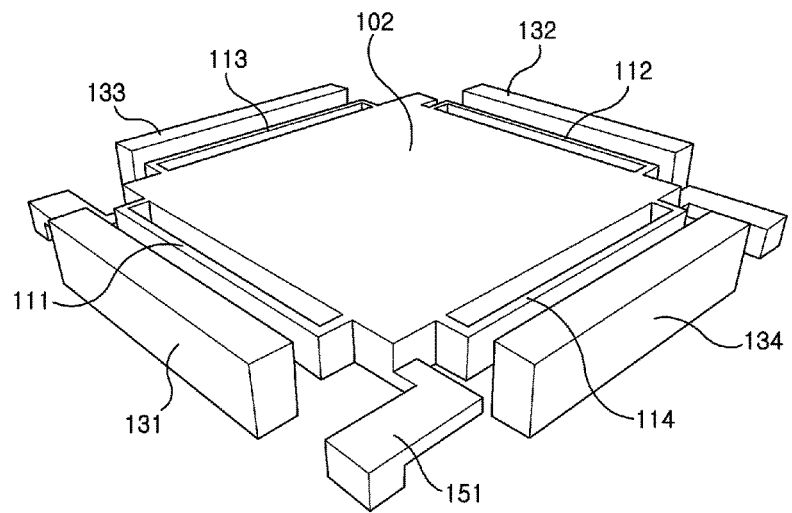

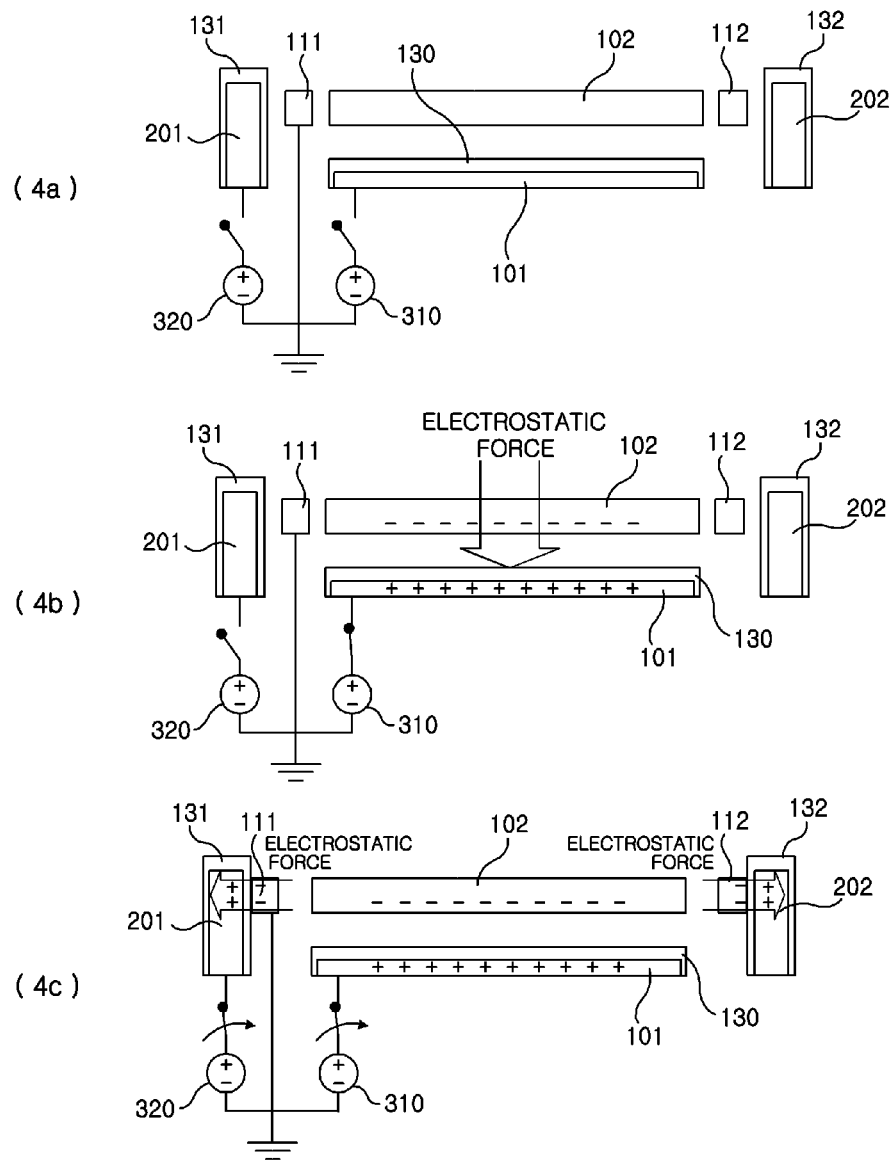

[Fig. 5]
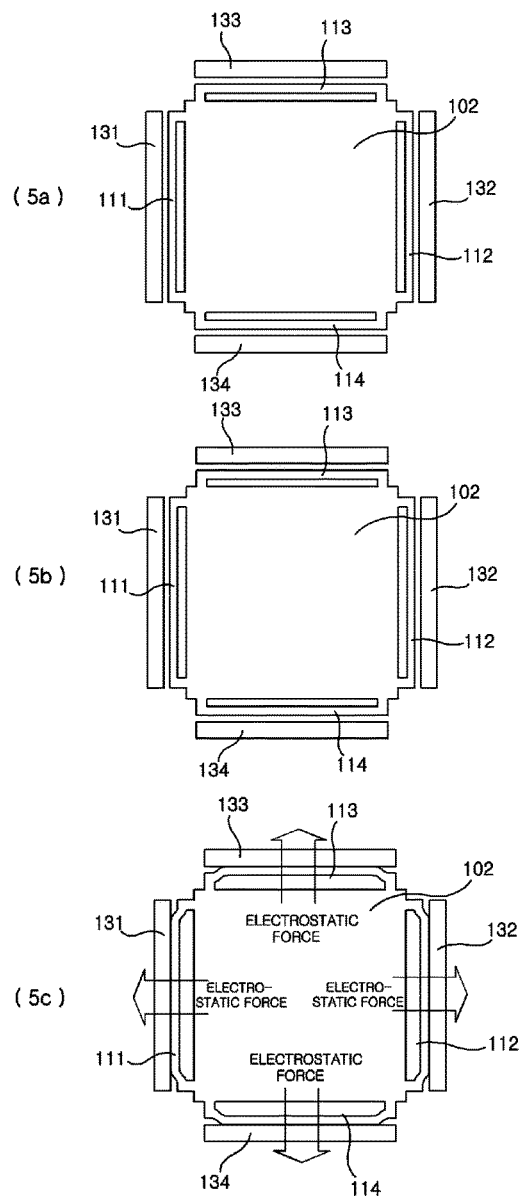
[Fig. 6]
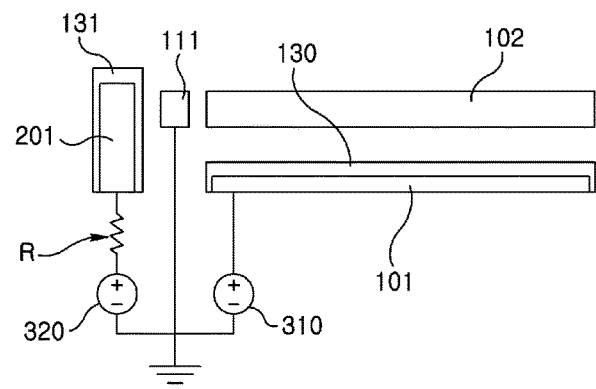

[Fig. 7]
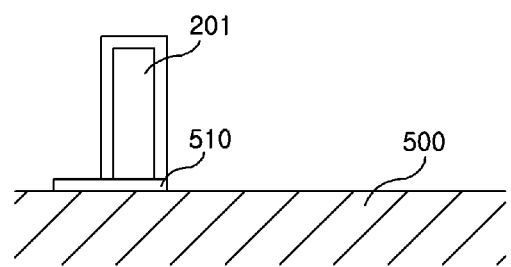

MEMS VARIABLE CAPACITOR AND METHOD FOR DRIVING THE SAME

CROSS-REFERENCE TO RELATED APPLICATIONS

This application is the U.S. national stage application of International Patent Application No. PCT/KR2011/003921, filed May 27, 2011, which claims priority to Korean Application No. 10-2010-0050592, filed May 28, 2010, the disclosures of each of which are incorporated herein by reference in their entirety.

TECHNICAL FIELD

The present invention relates to an MEMS variable capacitor and its driving method.

BACKGROUND ART

In a mobile communication system, an RF (Radio Frequency) block is designed to support several frequency bands, and in particular, capacitors used in a filter directly related to frequency bands must utilize a variable capacitor (also called variable reactance) having a different capacitance value for each frequency band.

In addition, a voltage controlled oscillators (VCO) among components of an RF block can obtain a change of a capacitance value by adjusting a voltage applied to a variable capacitor, and thus alter a resonant frequency.

As such, a variable capacitor is a very important device in a tunable filter or a voltage controlled oscillator of an RF block.

DISCLOSURE OF INVENTION

Technical Problem

The present invention solves challenges capable of preventing a variable capacitor from being self-actuation by power of a high RF signal, as a result of an interval between electrodes not changing.

Solution to Problem

The present disclosure provides an MEMS variable capacitor including, a first electrode; a second electrode floating over the first electrode upper part; a fixed electrode separated at a side surface of the second electrode; and a drifting electrode placed between the second electrode and the fixed electrode, connected to the second electrode, and physically contacting the fixed electrode by a voltage applied to the fixed electrode.

An interval of the first electrode and the second electrode is changed by varying a voltage applied to the first electrode.

The first electrode and the fixed electrode are formed at an substrate upper part, and the second electrode and the drifting electrode are connected to a spring fixed to the substrate so that the second electrode floats over the first electrode upper part.

In addition, a first insulating film for electric short prevention with the second electrode is formed overlying the first electrode, and the fixed electrode is formed with a second insulating film for electric short prevention with the drifting electrode.

Each of the fixed electrode and the drifting electrode is a pair of electrodes, or four of electrodes.

Moreover, the first electrode is connected to a first electric source, the fixed electrode is connected to a second electric source, and the drifting electrode is connected to a Ground.

The voltage applied to the fixed electrode is applied through an RF signal flow prevention-purpose resistor.

An SiC layer is formed between the substrate and the fixed electrode, and a voltage served to the fixed electrode is applied through the SiC layer.

In the present invention, a drive method of an MEMS variable capacitor is provided, including, preparing an MEMS variable capacitor containing a first electrode, a second electrode floating over the first electrode upper part, a fixed electrode separated at the second electrode side surface, and a drifting electrode placed between the second electrode and the fixed electrode, connected to the second electrode, physically contacting the fixed electrode by a voltage applied to the fixed electrode; maintaining an interval of the first electrode and the second electrode, by applying a voltage to the first electrode; and clinging the drifting electrode to the fixed electrode, by applying a voltage to the fixed electrode.

A voltage applied to the first electrode is lower than a pull-in voltage.

A voltage applied into the fixed electrode is higher than a pull-in voltage.

Subsequent to a step of clinging the drifting electrode to the fixed electrode by applying a voltage to the fixed electrode, a step of flowing through an RF signal from the first electrode to the second electrode, or from the second electrode to the first electrode is further included.

Advantageous Effects of Invention

An MEMS variable capacitor of the invention has an effect of realizing a variable capacitor with various capacitance values, since it may change a voltage applied to a second electrode to variously adjust an interval between a first electrode and a second electrode.

And, an MEMS variable capacitor of the invention has an effect of not changing capacitance even if a power of an applied RF signal alters, because an interval between a first electrode and a second electrode is not changing.

Also, an MEMS variable capacitor of the invention has an effect that a variable capacitor is not self-actuated by a power of a high RF signal, because an interval between a first electrode and a second electrode is not changed.

In addition, an MEMS variable capacitor of the invention may solve disadvantages that a tuning range of capacitors decreases in accompany with the increase of a power of an applied RF signal, by varying a voltage applied to a second electrode and thus adjusting an interval between a first electrode and the second electrode.

BRIEF DESCRIPTION OF DRAWINGS

FIG. 1 is a schematic cross-section of MEMS variable capacitors according to the invention;

FIG. 2 is a schematic top view for describing an embodiment of an MEMS variable capacitor according to the invention;

FIG. 3 is a schematic perspective view for describing an embodiment of an MEMS variable capacitor according to the invention;

FIGS. 4a through 4c are conceptual views for describing a drive method of an MEMS variable capacitor according to the invention;

FIGS. 5a through 5c are planar views for describing a drive method of an MEMS variable capacitor according to the invention;

FIG. 6 is a schematic conceptual view for describing a state in which an RF signal flow prevention-purpose resistor is formed at an MEMS variable capacitor according to the invention; and FIG. 7 is a schematic partial cross-section for describing one example in which an RF signal flow prevention-purpose resistor applied to the invention is formed.

BEST MODE FOR CARRYING OUT THE INVENTION

Hereinafter, a reference will be made to the accompanying drawings to describe an embodiment of the invention.

FIG. 1 is a schematic cross-section of MEMS variable capacitors according to the invention.

An MEMS variable capacitor according to the present invention with its construction includes a first electrode 101; a second electrode 201 floated over an upper part of the first electrode 101; a fixed electrode 201 separated at the second electrode 102 side surface; and a drifting electrode 111 placed between the second electrode 102 and the fixed electrode 201, connected to the second electrode 101, and physically contacting the fixed electrode 201 by a voltage applied to the fixed electrode 201.

Herein, the second electrode 102 in its definition floats over the upper part of the first electrode 101, in a state of separated by a given interval from an upper part surface of the first electrode 101.

By reference, in FIG. 1, the first electrode 101 is formed with a first insulating film 130, and an interval between the first insulating film 130 and the second electrode 102 is shown 'a', so the second electrode 102 is far off by a given interval from the upper part surface of the first electrode 101.

And, the first electrode 101 may be defined as a lower electrode, and the second electrode 102 may be defined as an upper electrode.

Such an MEMS variable capacitor can vary a voltage applied to the first electrode 101 and thus variously adjust an interval between the first electrode 101 and the second electrode 102, thereby realizing a variable capacitor having manifold capacitance values.

And, by a movement preclusion of the second electrode 102 performed by physically contacting the drifting electrode 111 to the fixed electrode 201 through a voltage applied to the fixed electrode 201, an interval between the first electrode 101 and the second electrode 102 remains unchanged.

At this time, when an RF signal from the first electrode 101 to the second electrode 102 is applied, the RF signal passes through a capacitor made up of the first Herein, the RF signal may be applied from the second electrode 102 to the first electrode 101.

Hence, reasoning that an interval (a) between the first electrode 101 and the second electrode 102 is not changed, capacitance is unaltered though a power of applied RF signal is changed, for which an MEMS variable capacitor of the invention is charming.

And, an MEMS variable capacitor of the invention, in which an interval between the first electrode 101 and the second electrode 102 is unchanged, has an advantage in that by power of a high RF signal, a variable capacitor is not self-actuated.

Also, an MEMS variable capacitor of the invention varies a voltage applied to the first electrode 101 to adjust an interval between the first electrode 101 and the second electrode 102, having an attraction capable of solving disadvantages that a tuning range of capacitors decreases as the increase of power of an applied RF signal.

On the one hand, as an MEMS variable capacitor being realized by MEMS (Micro Electro Mechanical Systems) technologies, as shown in FIG. 1, a substrate 500 upper part is formed with a first electrode 101 and a fixed electrode 201, and in connection of a second electrode 102 and a drifting electrode 111 to a spring (not shown) fixed to the substrate 500, the second electrode 102 can float over the upper part of the first electrode 101.

The substrate 500 may be for example applied with a glass board or silicon board.

And, a first insulating film 130 formed on the first electrode 101 prevents an electric short with the second electrode 102, and a second insulating film 131 formed on the fix electrode 201 prohibits an electric short with the drifting electrode 111.

In addition, as shown in FIG. 1, each of the bilateral sides of the first electrode 101 and the second electrode 102 is formed with '201' and '202' fixed electrodes.

Also, '111' drifting electrode is formed between the first electrode 101 and '201' fixed electrode, and between the second electrode 102 and '202' fixed electrode, '112' drifting electrode is formed.

That is, a pair of fixed electrode 201, 202 and a pair of drifting electrodes 111, 112 may be applied.

At this time, when toward the first electrode 101 is applied with a voltage, the '111', '112' drifting electrodes are separated from the second electrode 102 and '201' and '202' fixed electrodes.

Mode for the Invention

FIG. 2 is a schematic top view for describing an embodiment of an MEMS variable capacitor according to the present invention, and FIG. 3 is a schematic perspective view for describing an embodiment of an MEMS variable capacitor according to the invention.

In an MEMS variable capacitor of the embodiment, a second electrode 102 is connected to four of drifting electrodes 111, 112, 113, 114, and to the four of drifting electrodes 111, 112, 113, 114, four of fixed electrodes (not recited with reference numerals of the drawing) is formed.

Herein, FIG. 2 is a top view of an MEMS variable capacitor, showing second insulating films 131, 132, 133, 134 facing the four of drifting electrodes 111, 112, 113, 114, in which the four of fixed electrodes are concealed by the second insulating films 131, 132, 133, 134.

And, both end parts of each of the four drifting electrodes 111, 112, 113, 114 are connected to the second electrode 102.

Therefore, by a voltage applied to the first electrode (not shown, but placed at the lower part of the second electrode 102), the four of drifting electrodes 111, 112, 113, 114, respectively, is physically bonded to the four of fixed electrodes (reference numerals of the drawing are not shown) in each, thereby preventing the movement of the second electrode 102.

At this time, each of the four of drifting electrodes 111, 112, 113, 114 is bonded to second insulating films 131, 132, 133, 134 formed at each of the four of fixed electrodes.

In addition, four of drifting electrodes 111, 112, 113, 114 in the second electrode 102, as shown in FIG. 3, is connected to a spring 151, and the spring 151 is attached to a substrate 500 of FIG. 2, so that floating from a not-shown first electrode, a given interval between the first electrode and the second electrode 102 is maintained.

And, with intention that the second electrode 102 securely float over from the first electrode, the spring 151 may be comprised in four of them.

Also, the second electrode 102 may be realized in a polygon form, and the spring 151 may be connected to every edge of the second electrode 102.

FIGS. 4a and 4c are conceptual views for describing a drive method of an MEMS variable capacitor according to the present invention.

So as to drive the MEMS variable capacitor, a first electric source 310 is connected to a first electrode 101, and a second electric source 320 is connected to the fixed electrode 201, and the drifting electrode 111 is connected to ground.

Herein, like FIG. 4a, in case a fixed electrode is two, it is favorable that '201' fixed electrode and '202' fixed electrode are commonly connected to the second electric source 320.

Of course, also in case a fixed electrode is four, all of them are commonly connected to the second electric source 320.

In a drive method of a thus-electrically connected MEMS variable capacitor, when first the first electric source 310 applies a voltage to the first electrode 101, from an initial state of FIG. 1, the second electrode 102 moves to the first electrode 101, and like FIG. 4b, an interval between the first electrode 101 and the second electrode 102 is smaller.

That is, as a voltage between the first electrode 101 and the second electrode 102 is applied, an electrostatic force between the first and the second electrode 101, 102 occurs, and a gap distance between the first and the second electrodes 101, 102 changes, and thus a capacitor having a desired capacitance value is realized.

At this time, based on a voltage applied from the first electric source 310 to the first electrode 101, an interval between the first electrode 101 and the second electrode 102 is determined.

Herein, when a voltage between the first electrode 101 and the second electrode 102 is evenly maintained, an interval between the first electrode 101 and the second electrode 102 is constantly kept, thus the capacitance remains unchanged.

A voltage applied to the first electrode 101 from the first electric source 310 must be lower than a pull-in voltage that makes the second electrode 102 bond to the first electrode 101.

That is, if a voltage applied from the first electric source 310 to the first electrode 101 is over a pull-in voltage, the second electrode 102 physically bonds to the first electrode 101.

Thereafter, by applying a voltage from the second electric source 320 to the fixed electrode 201, producing electrostatic force around between the fixed electrode 201 and the drifting electrode 111, the drifting electrode 111 is bonded to the fixed electrode 201. (FIG. 4c)

At this moment, the fixed electrode 201 is formed with a second insulating film 131, an electric short should not occur in a stuck state of the fixed electrode 201 and the drifting electrode 111.

If a voltage applied to the fixed electrode 201 from the second electric source 320 is only higher than a pull-in voltage, the drifting electrode 111 bonds to the fixed electrode 201.

As above-described in FIG. 4c, after the drifting electrode 111 is bonded to the fixed electrode 201, a step of flowing an RF signal from the first electrode 101 to the second electrode 102 or from the second electrode 102 to the first electrode 101 may be further performed.

FIGS. 5a through 5c are schematic plain views for describing a drive method of an MEMS variable capacitor according to the invention.

On the plan view of the MEMS variable capacitor, the first electrode is not shown as placed at the second electrode lower part, and the fixed electrode is not shown for it is surrounded by second insulating films 131, 132, 133, 134.

At this time, as described above, in an initial state a voltage is not applied to the first electrode (reference numeral no shown) an a fixed electrode (reference numeral no shown) of the MEMS variable capacitor, As shown in FIG. 5a, the first electrode (reference numeral no shown) and a second electrode 102 maintains an interval of the initial state, and between the fixed electrode and the drifting electrode 111, 112, 113, 114 is separated.

Thereafter, by applying a voltage toward the first electrode (reference numeral no shown), thus maintaining an interval of the first electrode (reference numeral no shown) and a second electrode 102, a desired capacitance is obtained. (FIG. 5b)

Successively, the fixed electrode (reference numeral no shown) is applied with a voltage, like FIG. 5c, so that the drifting electrode 111, 112, 113, 114 is bonded to the fixed electrode.

FIG. 6 is a schematic conceptual view for describing a state an RF signal flowing prevention-use resistor is formed into an MEMS variable capacitor according to the invention, and FIG. 7 is a schematic partial cross-section for describing one example in which an RF signal flowing prevention-use resistor applied to the invention is formed.

In an MEMS variable capacitor according to the invention, an RF signal flows from a first electrode 101 to a second electrode 102 or the second electrode 102 to the first electrode 101, and passes through a capacitor comprised of the first electrode 101, the aerial layer and the second layer 102.

At this time, the RF signal may flow into a drifting electrode 111 placed at the lateral direction of the second electrode 102, so that leakage of such an RF signal may distort an RF signal characteristic.

Therefore, in an MEMS variable capacitor of the invention, it is favorable that between a fixed electrode 201 and a second electric source 320, an RF signal flowing prevention-use resistor R is formed.

That is, an electric pressure applied from the second electric source 320 to the fixed electrode 201, as shown in FIG. 6, is designed to be applied through the RF signal flowing prevention-use resistor R.

Such an RF signal flowing prevention-use resistor R is exemplified as one construction like FIG. 7, in which on a substrate 500 is an SiC layer 510, the SiC layer 510 is formed with a fixed electrode 201, and then the SiC layer 510 is connected to a second electric source 320.

While the present invention has been described in detail only regarding specific examples, it is clear to those skilled in the art that various modifications and variations can be made within the scope of the invention. And, it is obvious that such a modification and variation pertains to the accompanying claims.

INDUSTRIAL APPLICABILITY

The present invention may realize an MEMS variable capacitor solving disadvantages in which a tuning range of capacitors decreases as the increase of power of an applied RF signal, thereby improving characteristics of RF devices applied with the MEMS variable capacitor.

The invention claimed is:

1. A MEMS variable capacitor, comprising:
   a first electrode;
   a second electrode floating over an upper part of the first electrode;
   a fixed electrode separated at a side surface of the second electrode;
   an electric source including a first electric source for applying a voltage to the first electrode and a second electric source for applying a voltage to the fixed electrode;
   a drifting electrode placed between the second electrode and the fixed electrode, connected to the second electrode, and configured to contact the fixed electrode by applying a voltage from the second electric source to the fixed electrode and producing electrostatic force between the fixed electrode and the drifting electrode;
   a first insulating film on the first electrode for electric short prevention with the second electrode; and
   a second insulating film on the fixed electrode for electric short prevention with the drifting electrode;
   wherein the second electrode is configured to be contacted with the first electrode by the voltage of the first electric source,
   wherein the voltage of the first electric source is lower than a pull-in voltage and the voltage of the second electric source is higher than the pull-in voltage,
   wherein the second electric source is configured to apply the voltage to the fixed electrode after the first electric source applies the voltage to the first electrode, and
   wherein the first electrode and the fixed electrode are formed at a substrate, and the second electrode and the drifting electrode are connected to a spring fixed to the substrate so that the second electrode floats over the upper part of the first electrode.

2. The MEMS variable capacitor of claim 1, wherein the variable capacitor varies a voltage applied to the first electrode to vary change of an interval of the first electrode and the second electrode.

3. The MEMS variable capacitor of claim 1, wherein the drifting electrode is connected to a Ground.

4. The MEMS variable capacitor of claim 1, wherein the voltage applied to the fixed electrode is applied through an RF signal flow prevention-purpose resistor.

5. The MEMS variable capacitor of claim 1, wherein an SiC layer is formed between the substrate and the fixed electrode, and a voltage served to the fixed electrode is applied through the SiC layer.

6. The MEMS variable capacitor of claim 1, wherein the second electrode is a polygon shape.

7. The MEMS variable capacitor of claim 1, wherein a portion of the drifting electrode is physically spaced apart from the second electrode.

8. The MEMS variable capacitor of claim 1, wherein the first electrode and the second electrode produce a variable capacitance.

* * * * *